United States Patent
Maytal et al.

(10) Patent No.: US 6,934,368 B2
(45) Date of Patent: Aug. 23, 2005

(54) MULTI-BAND MODEM

(75) Inventors: Benjamin Maytal, Mevaseret Zion (IL); Gil Koifman, Petah Tikva (IL); Tsahi Tal, Tel-Mond (IL)

(73) Assignee: SmartLink Ltd., Netanya (IL)

( * ) Notice: Subject to any disclaimer, the term of this patent is extended or adjusted under 35 U.S.C. 154(b) by 17 days.

(21) Appl. No.: 10/639,222

(22) Filed: Aug. 11, 2003

(65) Prior Publication Data

US 2004/0101114 A1 May 27, 2004

Related U.S. Application Data

(60) Provisional application No. 60/403,212, filed on Aug. 12, 2002, and provisional application No. 60/429,517, filed on Nov. 27, 2002.

(51) Int. Cl.[7] ............................................. H04M 11/00
(52) U.S. Cl. ............................... 379/93.08; 379/90.01; 379/93.28; 375/222
(58) Field of Search ................ 379/90.01, 93.01–93.09, 379/93.14, 93.21, 93.26, 93.28, 93.37, 110.01; 375/222, 224, 259, 245

(56) References Cited

U.S. PATENT DOCUMENTS

| | | |
|---|---|---|
| 4,736,318 A | 4/1988 | Delyani et al. |
| 4,965,641 A | 10/1990 | Blackwell et al. |
| 5,339,413 A | 8/1994 | Koval et al. |
| 5,392,448 A | 2/1995 | Frankel et al. |
| 5,423,022 A | 6/1995 | Ackley |
| 5,541,955 A | 7/1996 | Jacobsmeyer |
| 5,625,643 A * | 4/1997 | Kaku et al. .................. 375/222 |
| 5,628,013 A | 5/1997 | Anderson et al. |
| 5,721,922 A | 2/1998 | Dingwall |
| 5,848,150 A | 12/1998 | Bingel |
| 6,026,079 A | 2/2000 | Perlman |
| 6,044,107 A | 3/2000 | Gatherer et al. |
| 6,092,095 A | 7/2000 | Maytal |
| 6,130,893 A | 10/2000 | Whittaker et al. |
| 6,240,166 B1 | 5/2001 | Collin et al. |
| 6,345,047 B1 | 2/2002 | Regnier |
| 6,522,730 B1 | 2/2003 | Timm et al. |
| 6,785,340 B1 * | 8/2004 | Stockman et al. .......... 375/259 |

FOREIGN PATENT DOCUMENTS

| | | |
|---|---|---|
| EP | 0820168 | 1/1998 |
| EP | 0889615 | 1/1999 |
| WO | WO 98/27665 | 6/1998 |
| WO | WO 01/41418 | 6/2001 |
| WO | WO 01/58173 | 8/2001 |

OTHER PUBLICATIONS

David E. Dodds, et al., "Simultaneous Voice and Internet Data on Rural Subscriber Lines," Communications. Computers and Signal Processing, Aug. 22–24, 1999, pp. 18–21.
Kalet I, et al., "The Capacity of PCM Voiceband Channels," Proceedings of the International Conference on Communications (ICC), vol. 3, May 23–26, 1993, pp. 507–511.

* cited by examiner

*Primary Examiner*—Wing Chan
(74) *Attorney, Agent, or Firm*—Townsend and Townsend and Crew LLP (57) ABSTRACT

A method for communication includes modulating a stream of data in accordance with a voice-band modem specification, so as to generate a modulated signal. The modulated signal is up-shifted to generate a passband signal, which is transmitted over a telephone line simultaneously with a baseband voice signal.

39 Claims, 7 Drawing Sheets

MULTI-BAND MODEM

CROSS-REFERENCE TO RELATED APPLICATIONS

This application claims the benefit of U.S. Provisional Patent Application 60/403,212, filed Aug. 12, 2002, and of U.S. Provisional Patent Application 60/429,517, filed Nov. 27, 2002. Both of these provisional applications are incorporated herein by reference.

FIELD OF THE INVENTION

The present invention relates generally to modems, and specifically to data modems for use over telephone lines.

BACKGROUND OF THE INVENTION

Modems are used for transferring information between parties on communication lines or other communication media. The modem converts information from electrical signals on the communication line to data bits, and vice versa. In the past, nearly all modems used in homes and small offices operated by dial-up over telephone lines, and were therefore constrained by telephone circuitry to operate in the "voice band," up to about 4 kHz. Standard voice-band modems (also referred to as analog modems) are therefore limited to low data rates, typically no more than 56 kbps, as specified by the ITU-T V.34, V.90 and V.92 recommendations, for example.

Recently, new types of modems have come into use, such as Digital Subscriber Line (DSL) modems, offering much higher data rates over telephone lines. DSL operation, however, requires installation of special, costly hardware at both the customer premises and the central office of the telephone company.

SUMMARY OF THE INVENTION

Embodiments of the present invention enable data transfer over a telephone line at enhanced rates, using simple modifications to existing voice-band modem hardware. These modifications enable such modems to communicate over telephone lines at passband frequencies, above the voice band.

In some embodiments of the present invention, modems are configured to communicate over a telephone line simultaneously in multiple frequency bands. At each end of the telephone line, one or more modems generate multiple, parallel signals in different frequency bands. Each signal carries digital data, which are typically encoded in accordance with an applicable voice-band modem standard, such as V.90 or V.92. One of the signals may be transmitted in the baseband (typically up to about 4 kHz), while each of the other signals is up-shifted at the transmitting end of the line to a different passband frequency range. The multiple signal streams in the baseband and one or more passbands are combined for transmission over the line. At the receiving end, the signal streams are demultiplexed, and the passband signals are down-shifted in order to recover the transmitted data. The up-shifting and down-shifting operations may be performed either by analog modulation and demodulation or by digital signal processing techniques.

In other embodiments of the present invention, this sort of passband conversion of voice-band modem signals is used to enable simultaneous voice and data transmission over a telephone line. In this case, the baseband range, below about 4 kHz, is used for voice signals, which are preferably filtered to avoid interference with the modem signals in higher frequency ranges. When the telephone line is in use for voice communications, the modem signals are up-shifted to a passband above the voice band. When the line is not needed for voice communications, the modem signals may use all or part of the baseband range, as well. This line multiplexing technique also allows the modems to communicate in an "always on" mode, so that there is no need, for example, for the customer to dial up to the central office modem before starting a data session.

There is therefore provided, in accordance with an embodiment of the present invention, a method for data transmission, including:

modulating at least first and second streams of data in accordance with a voice-band modem specification, so as to generate respective first and second modulated signals;

up-shifting at least the second modulated signal to generate a passband signal; and simultaneously transmitting the passband signal and transmitting the first modulated signal as a baseband signal over a telephone line.

Typically, the voice-band modem specification is selected from among ITU-T recommendations V.34, V.90 and V.92.

In one embodiment, modulating at least the first and second streams of the data includes modulating a third stream of the data to generate a third modulated signal, and up-shifting at least the second modulated signal includes up-shifting the second modulated signal to a first passband, and up-shifting the third modulated signal to a second passband, above the first passband, and transmitting the passband signal includes transmitting the second and third modulated signals over the communication medium in the first and second passbands, respectively, while transmitting the first modulated signal over the communication medium as the baseband signal.

Typically, transmitting the passband signal includes mixing the up-shifted second modulated signal with the baseband signal for transmission over the communication medium.

In a disclosed embodiment, modulating at least the first and second streams of the data includes modulating the first stream of the data using a first modem to generate the first modulated signal, and modulating the second stream of the data using a second modem to generate the second modulated signal. Typically, the first and second modems include legacy voice-band modems, and modulating the first and second streams of the data using the first and second modems includes generating first and second modulated analog signals using the modems, and up-shifting at least the second modulated signal includes applying analog up-shifting to the second modulated analog signal.

Additionally or alternatively, up-shifting at least the second modulated signal includes applying single-side-band modulation to the second modulated signal, or mixing the second modulated signal with a carrier frequency in the passband.

Alternatively, the second modulated signal includes a sequence of digital samples, and up-shifting at least the second modulated signal includes applying a digital frequency shift to the second modulated signal so as to generate frequency-shifted digital samples. Typically, transmitting the passband signal includes converting the frequency-shifted digital samples to an analog output signal.

In a disclosed embodiment, up-shifting at least the second modulated signal includes generating at least one passband signal, and the method includes simultaneously receiving the baseband signal transmitted over the telephone line as a first input baseband signal, and receiving the at least one passband signal transmitted over the telephone line, down-shifting the at least one received passband signal to generate at least a second input baseband signal, and demodulating at least the first and second input baseband signals, respectively using at least first and second voice-band modems, to recover the first and second streams of the data.

There is also provided, in accordance with an embodiment of the present invention, a method for communication, including:

modulating a stream of data in accordance with a voice-band modem specification, so as to generate a modulated signal;

up-shifting the modulated signal to generate a passband signal; and simultaneously transmitting the passband signal and a baseband voice signal over a telephone line.

Typically, the method includes filtering at least one of the voice signal and the passband signal so that the voice signal does not substantially interfere with the passband signal.

In a disclosed embodiment, transmitting the passband signal includes extending a bandwidth used for transmission of the stream of data when the telephone line is not in use for transmitting the baseband voice signal, detecting use of the telephone line for transmitting the baseband voice signal, and reducing the bandwidth responsively to the use of the telephone line for transmitting the baseband voice signal. Typically, detecting the use of the telephone line includes detecting an off-hook status of a telephone used in transmission of the baseband voice signal. Additionally or alternatively, detecting the use of the telephone line includes detecting a ring on the telephone line. Typically, transmitting the passband signal includes maintaining a substantially continuous connection between first and second modems used in transmitting the passband signal while a telephone used in the transmission of the baseband voice signal over the voice-band medium is both on hook and off hook.

Typically, the method further includes receiving the passband signal transmitted over the telephone line, down-shifting the received passband signal to generate an input baseband data signal, and demodulating the input baseband data signal using a voice-band modem to recover the stream of data. The method may include receiving the baseband voice signal simultaneously with receiving the passband signal, and splitting the voice signal from the passband signal so as to transmit the voice signal over a switched telephone network.

There is additionally provided, in accordance with an embodiment of the present invention, a method for receiving data, including:

receiving a data signal transmitted over a telephone line, the data signal including a first baseband component and a passband component;

down-shifting the passband component to generate at least a second baseband component; and demodulating at least the first and second baseband components, using first and second voice-band modems, respectively, to recover at least first and second streams of the data.

In a disclosed embodiment, down-shifting the passband component includes applying first and second down-shifts to generate, respectively, the second baseband component and a third baseband component, and demodulating at least the first and second baseband components includes demodulating the third baseband component to recover a third stream of the data.

In a further embodiment, down-shifting the passband component includes applying analog down-shifting to the data signal so as to separate the first and second baseband components, and demodulating at least the first and second baseband components includes digitizing each of the baseband components individually for input to the respective voice-band modems. Alternatively, down-shifting the passband component includes digitizing the data signal to generate a sequence of digital samples, and applying a digital frequency shift to the samples so as to generate the second baseband component.

There is further provided, in accordance with an embodiment of the present invention, apparatus for data transmission, including:

data modulation circuitry, which includes:

first and second voice-band modems, which are respectively coupled to modulate first and second streams of data in accordance with a voice-band modem specification, so as to generate respective first and second modulated signals;

an up-shifter, which is coupled to up-shift at least the second modulated signal to generate a passband signal; and an analog output circuit, which is coupled to transmit the passband signal and to transmit the first modulated signal as a baseband signal over a telephone line.

In a disclosed embodiment, the first and second voice-band modems are adapted to output the first and second signals as respective first and second sequences of digital samples, and the data modulation circuitry includes at least one digital/analog converter (DAC), which is adapted to convert the first and second sequences of the digital samples to respective first and second analog signals, and the up-shifter includes an analog frequency shifter, which is coupled to up-shift the second analog signal to the passband, and the data modulation circuitry further includes an analog mixer, which is adapted to mix the up-shifted second signal with the baseband signal for transmission over the telephone line. Typically, the analog frequency shifter includes at least one of a single side-band modulator and a frequency mixer, for mixing the modulated signal with a carrier frequency in the passband.

Typically, the apparatus includes a receiver, which is coupled to the telephone line so as to simultaneously receive the baseband signal as a first input baseband signal, and to receive the passband signal, and which is adapted to down-shift the received passband signal to generate a second input baseband signal, and to demodulate the first and second input baseband signals to recover the first and second streams of the data.

There is moreover provided, in accordance with an embodiment of the present invention, apparatus for data and voice communications, including:

a telephone, which is adapted to transmit and receive a baseband voice signal over a telephone line; and a modem, which is adapted to modulate a stream of data in accordance with a voice-band modem specification so as to generate a modulated signal and also to up-shift the modulated signal to generate a passband signal, and to transmit the passband signal over the telephone line simultaneously with the baseband voice signal.

Typically, the apparatus includes a filter, which is coupled to filter at least one of the voice signal and the passband signal so that the voice signal does not substantially interfere with the passband signal.

In a disclosed embodiment, the modem includes a line sensor, which is adapted to detect use of the telephone line for voice transmission, and data modulation circuitry, for generating the modulated signal with a specified bandwidth, wherein the data modulation circuitry is adapted, responsively to the line sensor, to extend the bandwidth used for transmission of the modulated signal when the telephone line is not in use for transmitting the baseband voice signal, and to reduce the bandwidth of the modulated signal when the telephone line is in use for voice transmission, relative to the bandwidth when the baseband voice signal is not being transmitted.

Typically, the apparatus includes a receiver, which is coupled to receive the passband signal transmitted over the telephone line, the receiver including a down-shifter, which is coupled to down-shift the received passband signal to generate an input baseband data signal, and a voice-band modem, which is adapted to demodulated the input baseband data signal to recover the stream of data. The receiver may be coupled to receive the baseband voice signal simultaneously with receiving the passband signal, and may include a splitter, which is coupled to split the voice signal from the passband signal, and a voice interface, which is coupled to receive the voice signal from the splitter and to transmit the voice signal over a switched telephone network.

There is furthermore provided, in accordance with an embodiment of the present invention, apparatus for receiving data, including:

an analog input circuit, which is adapted to receive a data signal transmitted over a telephone line, the data signal including a first baseband component and a passband component;

a down-shifter, which is coupled to down-shift the passband component so as to generate at least a second baseband component; and first and second voice-band modems, which are coupled to demodulate the first and second baseband components, respectively, to recover first and second streams of the data.

There is also provided, in accordance with an embodiment of the present invention, apparatus for data communication, including:

a data transmitter, which is adapted to modulate at least first and second streams of data in accordance with a voice-band modem specification, so as to generate respective first and second modulated signals, to up-shift at least the second modulated signal to generate a passband signal, and to simultaneously transmit the passband signal and transmitting the first modulated signal as a baseband signal over a telephone line; and a data receiver, which is coupled to simultaneously receive the baseband signal transmitted over the telephone line as a first input baseband signal, and to receive the passband signal transmitted over the telephone line, to down-shift the received passband signal to generate a second input baseband signal, and to demodulate the first and second input baseband signals, respectively using first and second voice-band modems, to recover the first and second streams of the data.

Typically, one of the data transmitter and data receiver is deployed as customer premises equipment, while the other of the data transmitter and data receiver is deployed in a central communication office.

There is additionally provided, in accordance with an embodiment of the present invention, a computer software product, including a computer-readable medium in which program instructions are stored, which instructions, when read by a computer, cause the computer to modulate at least first and second streams of data in accordance with a voice-band modem specification, so as to generate respective first and second modulated signals, to up-shift at least the second modulated signal to generate a passband signal, and to simultaneously transmit the passband signal and transmitting the first modulated signal as a baseband signal over a telephone line.

The present invention will be more fully understood from the following detailed description of the embodiments thereof, taken together with the drawings in which:

DETAILED DESCRIPTION OF EMBODIMENTS

Figure 1:
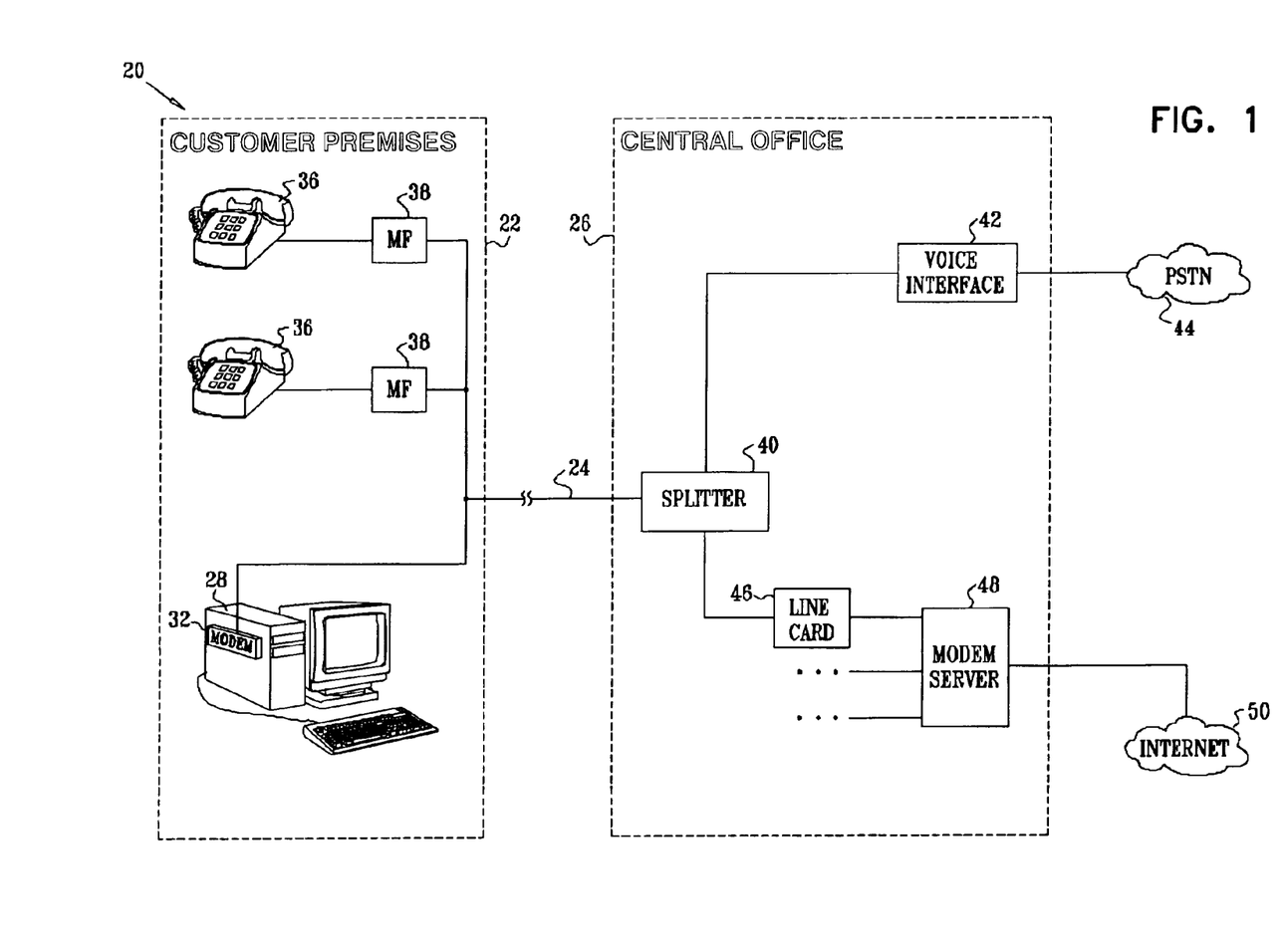
FIG. 1 is a block diagram that schematically illustrates a system for voice and data communications, in accordance with an embodiment of the present invention.

FIG. 1 is a block diagram that schematically illustrates a communication system 20, in accordance with an embodiment of the present invention. In this embodiment, system 20 provides data and voice communications over a telephone line 24 between a customer premises 22 and a central office 26. This operating environment is described here by way of example, and the principles of the present invention may similarly be used in other applications of data communications over telephone wires and other media, as will be evident to those skilled in the art.

In customer premises 22, a computer 28 is connected via a modem 32 to line 24. Modem 32 may comprise either a conventional hardware modem or a "soft" modem. In hardware modems, all the signal processing operations involved in extracting the data from incoming communication line signals, as well as generating outgoing signals to transmit data, are performed by dedicated modem hardware circuits. In soft modems, some or all of these signal processing functions are performed by a host processor in a computer that is connected to the line or other media. Soft modems thus take advantage of the computational power of the host and reduce the volume and cost of hardware that is required for communications. Exemplary soft modems are described in U.S. Pat. Nos. 4,965,641 and 6,092,095, whose disclosures are incorporated herein by reference.

The equipment in customer premises 22 also includes one or more telephone handsets 36, for use in voice communications. The handsets are connected to line 24 via microfilters 38, whose operation is described hereinbelow with reference to FIG. 7. Certain embodiments of the present invention, which are described below, enable line 24 to be used simultaneously for voice and data communications. Alternatively, in other embodiments, line 24 may be dedicated to modem 32, or shared by multiple modems. Although only a single modem and two telephones are shown in customer premises 22 in FIG. 1, the methods and devices described below can also support greater numbers of data and/or voice communication elements.

At central office 26, a splitter 40 separates the voice and data communications traffic, as is known in the art. A voice interface 42 transmits and receives the voice signals over a public switched telephone network (PSTN) 44. A line card 46 digitizes data signals from modem 32 and performs certain preprocessing functions on the resultant sequence of digital samples, which is then input to a modem server 48. The modem server comprises digital modem circuits (not shown in this figure), which extract the digital data from the sample sequence and transmit the data over a network 50, such as the Internet. Similarly, server 48 transforms digital data received from network 50 into digital samples, which are then converted to analog form by line card 46, for transmission over line 24. Typically, each line card supports multiple customer lines, and multiple line cards may be connected to server 48. The description that follows, however, focuses on communications between a single, exemplary customer premises modem 32 and the relevant elements of line card 46 and server 48.

Figure 2:
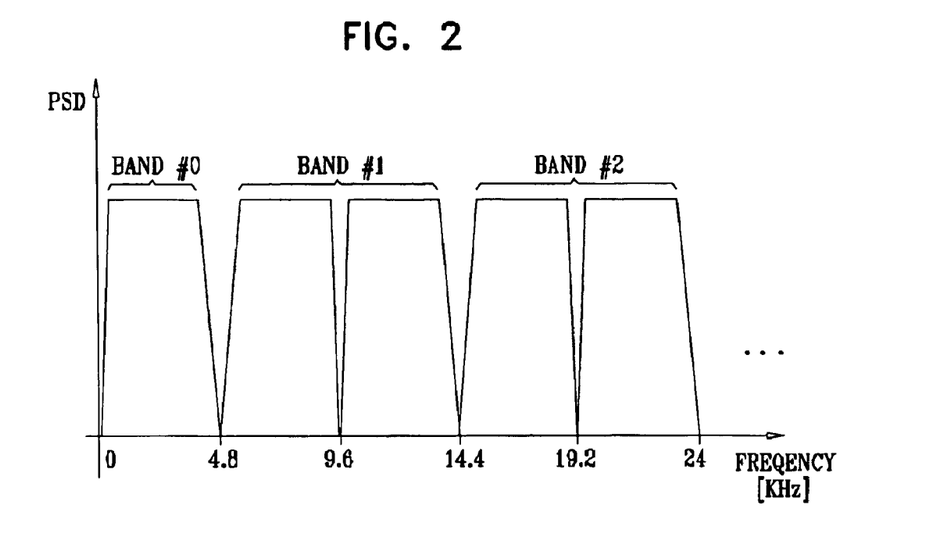
FIG. 2 is a schematic spectral diagram showing frequency bands that may be used in data communications over a telephone line, in accordance with an embodiment of the present invention.

FIG. 2 is a schematic spectral diagram showing frequency bands used in data communication between modem 32 and line card 46, in accordance with an embodiment of the present invention. Band #0, between 0 and 4.8 kHz, is the band used in conventional voice-band modem communications, according to the above-mentioned V.34, V.90 and V.92 recommendations. Line card 46 typically communicates with the digital modem circuits in server 48 via a 64 kbps pulse code modulated (PCM) connection, at a rate of 8000 samples per sec (8 bits/sample). At this sample rate, the transmitted spectrum to line 24 is theoretically limited to 4 kHz. Due to non-ideal filtering at the line card, the power spectral density (PSD) of the analog modem signals transmitted on the line may extend up to 4.8 kHz, as shown in the figure. In practice, the overall bit rate of the end-to-end baseband connection between modem 32 and server 48 does not reach the full 64 kbps of the PCM connection, but is rather limited to 33.6 kbps for V.34 or 56 kbps for V.90 and V.92.

In addition to standard, baseband communication on Band #0, however, modem 32 and line card 46 are configured to communicate on additional passbands, at higher frequencies, such as Band #1 and Band #2, shown in FIG. 2. Band #1 is up-shifted by 9.6 kHz relative to the baseband, and extends from 4.8 to 14.4 kHz, while Band #2 is up-shifted by 19.2 kHz, extending from 14.4 to 24 kHz. Each of these up-shifted bands typically carries additional analog modem signals, over and above the baseband signal in Band #0. The signals in Band #1 and Band #2 are generated using a standard voice-band modulation scheme, such as that specified by V.90 or V.92, but are upconverted by the applicable shift for transmission in the appropriate passband. Simple up-shifting of a real baseband signal to a real passband signal doubles the bandwidth that the signal occupies. Therefore, Band #1 and Band #2 in this embodiment take up twice the bandwidth of Band #0.

The spectrum shown in FIG. 2 allows the overall bandwidth of the connection between customer premises 22 and central office 26 to be effectively tripled, without adding telephone lines. Existing, legacy hardware may be used for this purpose, with relatively minor modifications. Additional bands at higher frequencies, above 24 kHz, may be added in similar fashion to increase the overall bandwidth still further, as long as line 24 is short enough and of adequate quality for carrying these higher frequencies. The carrier frequencies and the bandwidths of the communication bands shown here are chosen by way of example. Alternatively, different carrier frequencies and wider or narrower bands may be used (as long as each band is at least 4 kHz wide). Although the bands illustrated in the figures are immediately adjacent to one another, the bands could, alternatively, be spaced apart in frequency.

Figure 3:
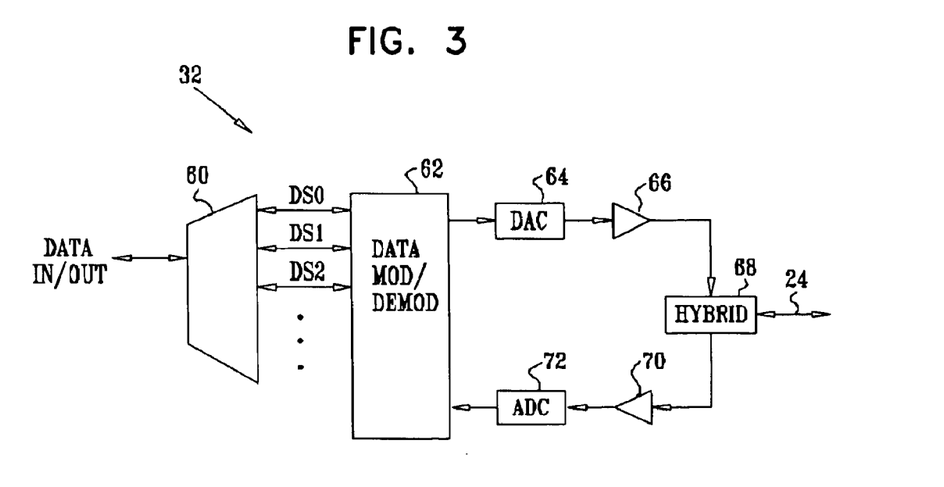
FIG. 3 is a block diagram that schematically illustrates a customer premises modem, in accordance with an embodiment of the present invention.

FIG. 3 is a block diagram that schematically shows details of modem 32, in accordance with an embodiment of the present invention. Applications running on computer 28 generate data for transmission. A multiplexer 60 divides the data into a number of output data streams, labeled DS0, DS1, DS2, . . . , to be transmitted over respective bands (Band #0, Band #1, etc.) on line 24. Any suitable multiplexing scheme known in the art may be used for this purpose. For example, each successive bit or byte of the data may be passed to a different output data stream in succession, possibly with the addition of synchronization signals for use in recombining the data streams at the destination.

A digital modulator/demodulator 62 converts each data stream into a corresponding sequence of digital samples, typically in accordance with the V.34 or V.92 recommendation. (V.34 is also the upstream transmission standard for V.90.) The samples that are to be transmitted over the passbands are digitally up-shifted by the applicable shift frequencies, such as 9.6 kHz and 19.2 kHz, and are then added together with the baseband samples to generate a single sequence of samples. When the transmission spectrum of FIG. 2 is used, modulator/demodulator 62 outputs a sequence of digital samples at a rate of 48,000 samples/sec. A digital/analog converter (DAC) 64, operating at a clock rate of 48 kHz, converts the digital samples to analog signals. The signals are scaled by an amplifier 66, and are then transmitted via a hybrid coupling circuit 68 upstream over line 24 to central office 26.

Downstream signals from the central office are likewise scaled by an amplifier 70, and are then digitized by an analog/digital converter (ADC) 72, operating at least at the same rate of 48,000 samples/sec. The digital samples are input to modulator/demodulator 62, which separates the sequence of samples into component sequences belonging to the different frequency bands (Band #0, Band #1, Band #2, . . . ). Any suitable digital signal processing scheme may be used for this purpose, including either time-domain or frequency-domain methods of digital filtering, as are known in the art. Modulator/demodulator 62 then digitally demodulates the component sample sequences to recover the separate input data streams DS0, DS1, DS2, etc. Multiplexer 60 passes on the input data streams for application-level processing by computer 28.

Assuming modem 32 to be a soft modem, the functions of multiplexer 60 and modulator/demodulator 62 may be carried out in software on the CPU of computer 28. Software for this purpose may be downloaded to the computer in electronic form, over a network, for example, or it may alternatively be provided on tangible media, such as CD-ROM. The analog hardware functions of DAC 64, ADC 72, amplifiers 66 and 70, and hybrid 68 are identical to those performed by hardware elements in existing modem front ends (in both soft modems and conventional hardware-based modems), although these functions are performed at a higher clock frequency in modem 32 than in analog modems known in the art. Alternatively, at least some of the functions of multiplexer 60 and modulator/demodulator 62 may be performed by a digital signal processor (DSP) or by dedicated digital modem hardware. For example, a number of legacy analog modems may be connected in parallel to multiplexer 60, so that each modem receives one of data streams DS0, DS1, DS2, etc. The analog outputs of the modems may be up-shifted by analog mixing, and then combined by an analog summer for transmission over line 24. An arrangement of this sort in line card 46 is described hereinbelow with reference to FIG. 4.

Further alternatively, the spectrum shown in FIG. 2 may be shared between voice and data functions, as described below, or among multiple different modems on customer premises 22. For example, modem 32 may be configured for baseband transmission, using Band #0, while the output and input of a second modem (not shown) are up- and down-shifted to use one of the passbands, such as Band #1.

Figure 4:
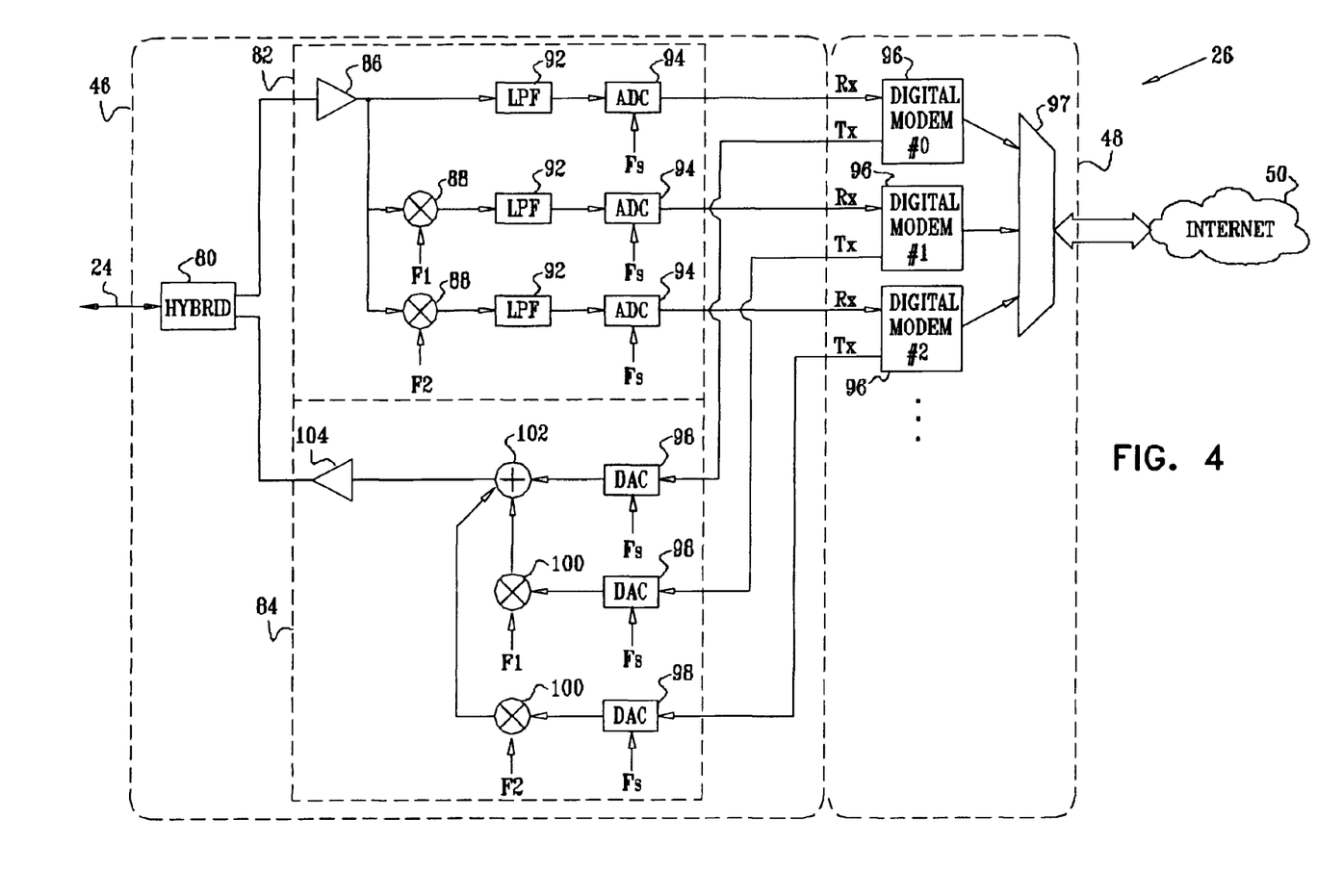
FIG. 4 is a block diagram that schematically illustrates a central office modem, in accordance with an embodiment of the present invention.

FIG. 4 is a block diagram that schematically illustrates elements of line card 46 and modem server 48, in accordance with an embodiment of the present invention. Line card 46 comprises receive path circuits 82 and transmit path circuits 84, which are coupled to line 24 by a hybrid coupler 80. Analog signals that are received upstream over line 24 are scaled by an amplifier 86, and are then fed to several parallel paths, one for each of the transmission bands shown in FIG. 2. In each of the passband paths, a mixer 88 down-shifts the received signals by the appropriate shift frequency ($F_1$=9.6 kHz or $F_2$=19.2 kHz in the present example). The upper path shown in FIG. 4 processes the baseband signal, Band #0, and therefore requires no down-shifting. The signals in each path are then filtered by an analog low-pass filter (LPF) 92, in order to reproduce the appropriate baseband analog signal for each of the transmission bands.

The filtered analog signal on each of the paths is sampled by an ADC 94, typically operating at a sampling frequency $F_2$=8 KHz. The ADCs typically operate at 8-bit resolution, with quantization steps in accordance with the applicable coding scheme (such as PCM A-law or $\mu$-law encoding, as defined in the G.711 standard and adopted in PCM-based modulation techniques such as those specified by the V.90 and V.92 recommendations). The digital samples from each path, typically at 64 kbps, are then passed to a corresponding digital modem 96 in server 48. A multiplexer 97 recombines the separate data streams (shown in FIG. 3 as DS0, DS1, DS2, . . . ) in order to reconstruct the original data for transmission over network 50. Modems 96 may be standard, legacy modems, and need not be aware of frequency shifting functions performed by line card 46. The functions of LPFs 92 and ADCs 94 are likewise substantially identical to filtering and digitization functions performed in legacy line cards, operating on baseband signals.

In the transmit path, multiplexer 97 divides the data received from network 50 among digital modems 96, which convey digital samples at 64 kbps to line card 46, including one sequence of samples for each transmission band that is in use. As in the receive path, the transmit functions of the digital modems may be carried out by legacy equipment, without modification. For each sequence of samples, a digital to analog converter (DAC) 98 converts the samples to analog signals, typically at a sample rate of 8 kHz, again using the appropriate quantization scheme (such as PCM A-law or $\mu$-law). The signals intended for passband transmission are up-shifted by analog mixers 100 to Band #1, Band #2, etc., by mixing the analog signals with the appropriate carrier frequencies $F_1$ and $F_2$. The baseband and passband signals are then summed by an analog summer 102 to give an analog output signal, which is scaled by an amplifier 104 and transmitted over line 24.

Figure 5:
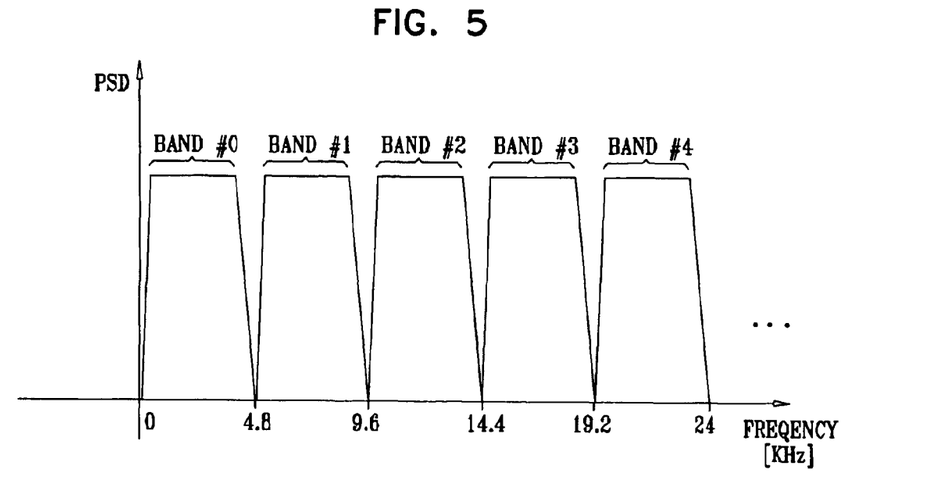
FIG. 5 is a schematic spectral diagram showing frequency bands that may be used in data communications over a telephone line, in accordance with another embodiment of the present invention.

FIG. 5 is a schematic spectral diagram that shows frequency bands used in data communication between modem 32 and line card 46, in accordance with an alternative embodiment of the present invention. Here, up-shifted modem signals in passbands labeled Band #1, Band #2, Band #3 and Band #4 are transmitted in a manner similar to that described above, except that here the voice-band signals are up-shifted using a single side band (SSB) modulation technique, as is known in the art. SSB modulation may be implemented, for example, by substituting appropriate upper side band (USB) or lower side band (LSB) modulators for mixers 100 in line card 46. In this case, each of the passbands has approximately the same bandwidth as the baseband, providing better spectral efficiency, i.e., giving a higher bit rate relative to the total bandwidth consumed. For example, in the present embodiment, the 24 kHz signal bandwidth gives a total of five bands, rather than three bands in the double side band case shown in FIG. 2. The spectrum of FIG. 5 can thus achieve a total bit rate of 280 kbps (five times the conventional voice-band bit rate of 56 kbps).

Figure 6:
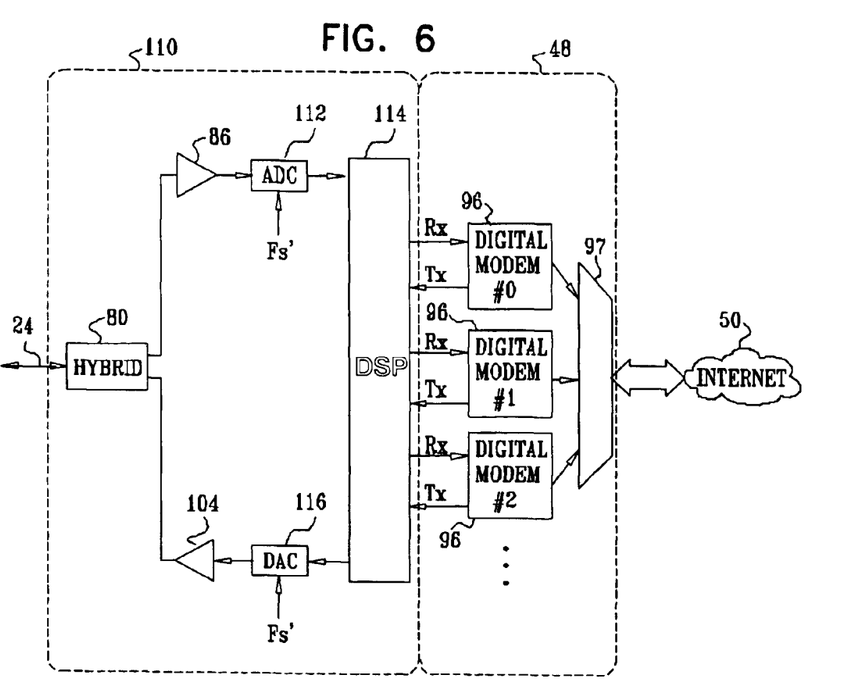
FIG. 6 is a block diagram that schematically illustrates a central office modem, in accordance with yet another embodiment of the present invention.

FIG. 6 is a block diagram that schematically illustrates elements of a line card 110 and modem server 48, in accordance with another embodiment of the present invention. Line card 110 performs substantially the same functions on the received and transmitted signals as does line card 46, but uses a digital signal processor (DSP) 114 to implement these functions digitally on all the bands together, instead of the separate analog hardware used for each band in line card 46. A single ADC 112 digitizes the upstream signals from line 24, at a sampling frequency $F_s'$ that is sufficient for the total transmission bandwidth ($F_s'$=48 kHz in the present example). Similarly, a single DAC 116 operating at frequency $F_s'$ converts the combined downstream digital samples from DSP 114 to analog form. Each of digital modems 96 is connected to DSP 114 by a digital 64 kbps connection in both the transmit and receive directions. As in the embodiment of FIG. 4, modems 96 may be legacy digital modems and need not be aware of the frequency multiplexing and demultiplexing operations performed by line card 110.

Figure 7:
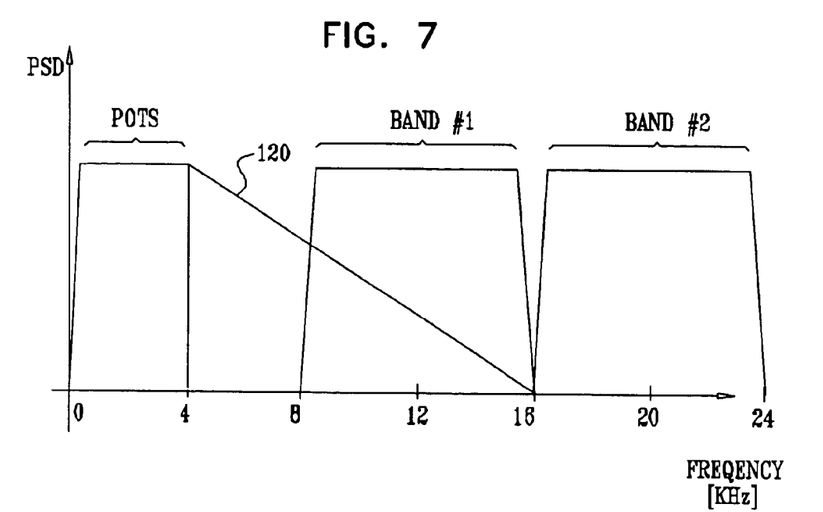
FIG. 7 is a schematic plot showing frequency bands that may be used in voice and data communications over a telephone line, in accordance with an embodiment of the present invention.

FIG. 7 is a schematic spectral diagram that shows frequency bands used in simultaneous voice and data communication over line 24 between customer premises 22 and central office 26, in accordance with an embodiment of the present invention. The low-frequency band, below about 4 kHz, is used for "plain old telephone service" (POTS), between telephone handsets 36 and voice interface 42 (FIG. 1). One or more higher-frequency passbands are used for data service between line card 46 and modem 32 (and possibly other modems, as well), using techniques of up- and down-shifting of voice-band modem signals, as described above.

Although most of the energy in the spectrum of human speech is in the range below 4 kHz, the human voice may go up to about 12 kHz. These high frequencies may interfere with the modem data signals in the high-frequency passbands. Similarly, when line 24 is used simultaneously for voice and data service, the modem signals may cause disturbing, audible interference in the audio signals received by handsets 36. To avoid these problems, microfilters 38, with a low-pass spectral response 120 as shown in FIG. 7, are typically used to filter both incoming and outgoing signals to and from the telephone handsets, thus reducing the crosstalk between the voice and data frequency bands.

Modem 32 may be configured to operate in either Band #1 or Band #2 or in both bands simultaneously, in the manner described above, as well as in other, higher-frequency passbands (not shown in the figures). Because Band #1, at lower frequency, may still encounter some voice interference, the modem typically transmits signals in this band at a lower data rate, for example, 32 kbps. Transmissions in high-frequency bands, such as Band #2, may proceed at the highest data rate that is supported. Furthermore, modem 32 may be switched in hardware or software, either manually or automatically, between operation over the limited spectrum shown in FIG. 7 and the broader spectrum shown in FIG. 2 or FIG. 5 (including the voice band) when line 24 is not being used for voice transmission. This option is further illustrated and described below with reference to FIGS. 10A and 10B.

Figure 8:
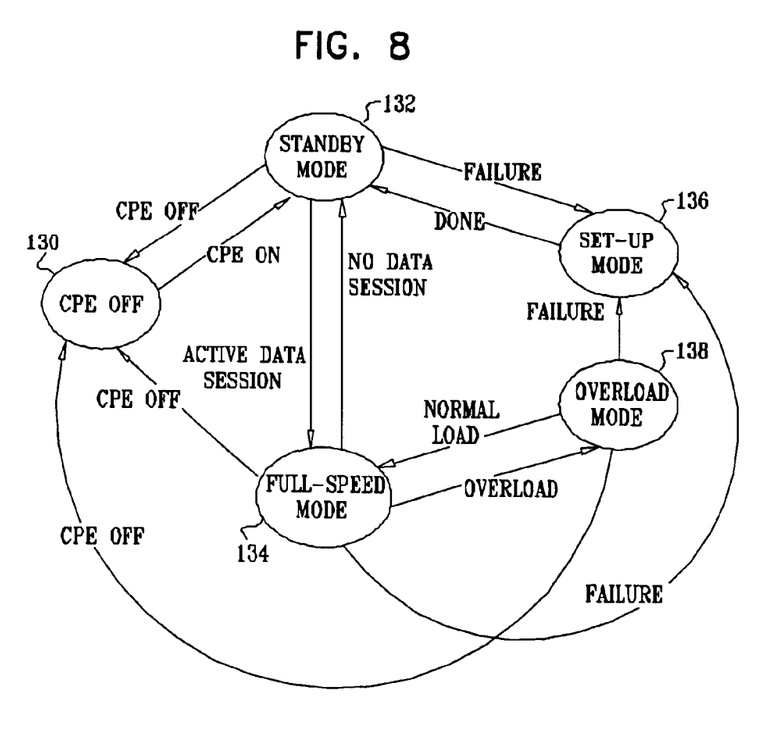
FIG. 8 is a state diagram that schematically illustrates operating states of a modem, in accordance with an embodiment of the present invention.

FIG. 8 is a state diagram that schematically illustrates operational modes of system 20 (FIG. 1), in accordance with an embodiment of the present invention. System 20 is typically designed and configured so that the modem equipment (line cards 46 and server 48) are always on, except for maintenance or catastrophic problems. Similarly, modem 32 is on except when turned off by the customer, in a customer premises equipment (CPE) off state 130. (When modem 32 is a soft modem, the system enters state 130 when computer 28 is turned off.)

When system 20 is initially set up or re-booted after a failure or maintenance, it enters a set-up mode 136. Since the same modem 32 and line card 46 are always connected by the same line 24, it is generally sufficient for the modem and line card to learn the line conditions once, when the system is first turned on. Optionally, these conditions and the applicable modem parameters determined for these conditions are stored at both modem 32 and central office 26. Furthermore optionally, system 20 does not return to the set-up mode again under normal operation.

While system 20 is in CPE off state 130, line card 46 may continue transmitting a tone on line 24. (The tone is useful, inter alia, as an aid to technicians in identifying active lines even when there is no activity on the lines.) When modem 32 is turned on, system 20 goes to a standby mode 132. Modem 32 recognizes the tone transmitted by line card 46 and initiates an "instant on" negotiation sequence to set the current transmission parameters. Alternatively, modem 32 may initiate the negotiation procedure without resort to any tone transmitted by the line card. For the purposes of the negotiation sequence, modems 32 and server 48 may use the stored parameters determined in set-up mode 136. The negotiation sequence is typically carried out over a low bandwidth connection, such as 9.6 kbps, at a low sampling rate, such as 8 kHz, in order to reduce the CPU load and power consumption of the modems in mode 132.

When an active data session starts, system 20 transfers to a full-speed mode 134. The data session may be initiated either by modem 32, when a browser application is launched, for example, or by modem server 48, when data are to be sent from central office 26 to customer premises 22. Typically, the full-speed mode uses the full bandwidth available, wherein modem 32 and line card 46 transmit and receive data on multiple bands simultaneously, as described above. The sampling rate of modem 32 and line card 46 in mode 134 may be adjusted depending on the line conditions. For example, assuming system 20 is configured to support a maximum data rate of 144 kbps, a sampling rate of 32 kHz may be sufficient to achieve this rate under good conditions, while a higher sampling rate, such as 48 kHz, may be needed for longer, more difficult lines. When the active data session is concluded, the modem that initiated the data session (modem 32 or server 48) may initiate a return to standby mode 132.

Optionally, to save equipment cost in central office 26, modem server 48 may have processing power that is sufficient for only a portion of the total data bandwidth available to all of the customer premises modems that are to be served. Normally, the customer premises modems do not all use their full, allotted bandwidth simultaneously, and the limited processing power of server 48 is therefore sufficient. To deal with the peak demand that occasionally occurs, however, an overload mode 138 is defined, together with a "watermark" indicative of the number of users that can be supported at full speed. Once server 48 reaches this watermark, all modems operating in system 20, including both customer premises and central office modems, enter mode 138. In this mode, the modems automatically degrade their performance so as to operate at a lower speed and bandwidth (for example, ¼ or ½ of full speed), thus requiring a lower sampling rate and less processing power. Several different watermarks of this sort may be defined, with corresponding overload states providing different data rates, depending on the degree of overload. Optionally, allocation of the number of bands and maximal bit rate for each customer premises station may be based on additional variables, such as quality of service.

Figure 9:
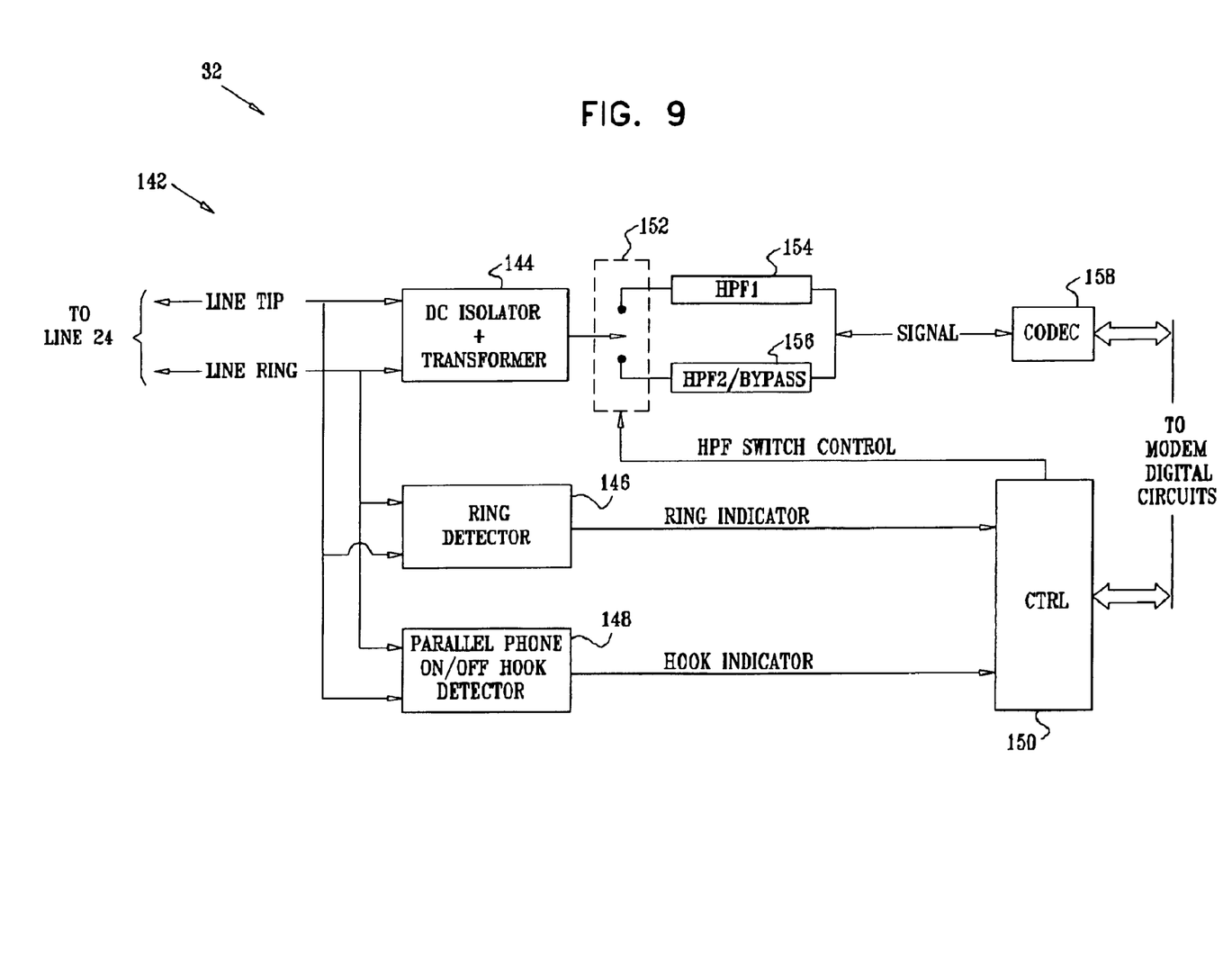
FIG. 9 is a block diagram that schematically illustrates modem front end circuitry, in accordance with an embodiment of the present invention.

FIG. 9 is a block diagram that schematically illustrates front end circuits 142 of modem 32, in accordance with an embodiment of the present invention. These circuits are used to enable the always-on operation of modem 32, while sharing line 24 with voice service to handsets 36. Modem 32 is connected to line 24 by a transformer 144, which provides DC isolation, so that modem 32 draws substantially no current from the telephone system, and line 24 appears to voice interface 42 to be "on hook" even when the modem is running. Circuits 142 comprise a ring indicator circuit 146 and an on/off hook indicator circuit 148, which indicate the state of handsets 36 to a controller 150 of modem 32.

While system 20 is in full-speed mode 134, controller 150 may change the operating state of modem 32 in response to signals from circuits 146 and 148, in order to accommodate changes in the state of handset 36. The controller may similarly respond to changes in the state of the telephone handset when system 20 is in other states (such as those shown in FIG. 8).

Figure 10A:
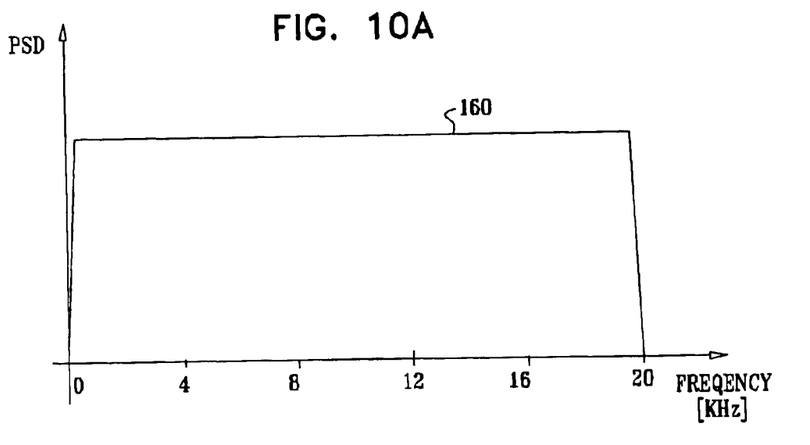
FIG. 10A is a schematic plot showing a frequency band used in data communication over a telephone line while a telephone on the line is on hook, in accordance with an embodiment of the present invention.

FIG. 10A is a schematic spectral diagram that shows a frequency band 160 used in data communication over line 24 between modem 32 and central office 26 while handsets 36 are on-hook, in accordance with an embodiment of the present invention. As long as there is no telephone session in progress and handsets 36 are on hook, modem 32 uses the entire spectrum available to it, which extends out to 20 kHz in the present embodiment. Alternatively, the data communication spectrum may be narrower or may extend out to still higher frequencies. Further alternatively or additionally, modem 32 may be configured to use only frequencies above the 4 kHz telephony band even while all handsets are on hook.

When detector 146 senses a ring signal on line 24, controller 150 switches modem 32 to ring mode. Because of the substantial signal interference created by the ring, modems using line 24 may be forced to re-train. While the ring mode persists, the modems may communicate at a lower bit rate, such as 33.6 kbps, or suspend communication. When the rings stops, if a user has not picked up handset 36 to answer the call, modem 32 returns to full-speed operation.

Figure 10B:
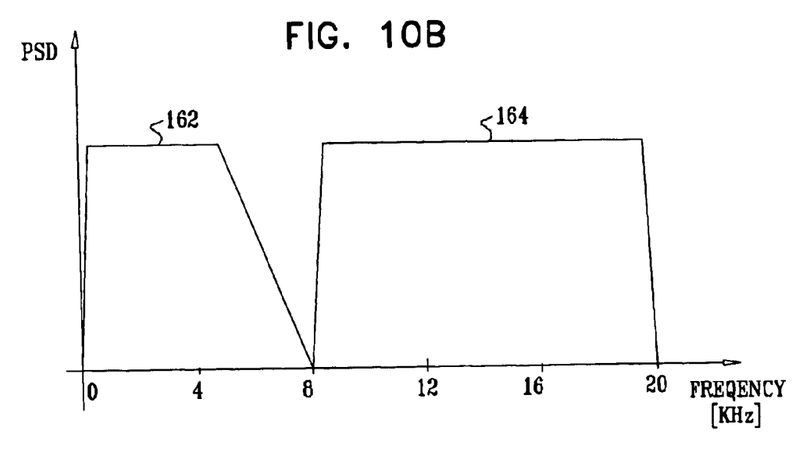
FIG. 10B is a schematic plot showing frequency bands used in voice and data communications over a telephone line while a telephone on the line is off hook, in accordance with an embodiment of the present invention.

FIG. 10B is a schematic spectral diagram that shows frequency bands 162 and 164 used in simultaneous voice and data communication over line 24, in accordance with an embodiment of the present invention. When the user picks up the phone to answer or to dial out, controller 150 instructs modem 32 to commence off-hook operation. In this mode, the modem uses only band 164, making band 162 available for voice communication. Typically, the modem bandwidth used in this mode is less than the full-speed bandwidth when handsets 36 are on hook, though still greater than the bandwidth of a conventional voice-band modem. The modem bandwidth may similarly be limited to band 164 when detector 146 senses the ring signal on line 24.

To accommodate the changes in modem bandwidth, controller 150 optionally drives a switch 152, according to whether handsets 36 are on or off hook. When a handset is off hook, switch 152 selects a strong high-pass filter 154, which filters out analog signals below about 8 kHz, as illustrated in FIG. 10B. When all the handsets are on hook, switch 152 selects a weaker high-pass filter 156, which has a lower cut-on (for example, 4 kHz), or simply passes substantially the entire range above DC to the modem circuits. In either case, a CODEC 158 digitizes the filtered signals and passes the resulting digital samples to the digital circuits of the modem for processing.

Although the embodiments described above make reference to certain particular types of voice-band modems, as specified in ITU-T recommendations, the principles of the present invention may similarly be applied in enhancing the bandwidth and usefulness of other types of modems that operate in the voice band. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for data transmission, comprising:
   dividing data generated by a computer into a plurality of data streams comprising at least first and second streams of the data;
   modulating at least the first and second streams of the data in accordance with a voice-band modem specification, so as to generate respective first and second modulated signals;
   up-shifting at least the second modulated signal to generate a passband signal; and
   simultaneously transmitting the passband signal and transmitting the first modulated signal as a baseband signal over a telephone line.

2. The method according to claim 1, wherein the voice-band modem specification is selected from among ITU-T recommendations V.34, V.90 and V.92.

3. The method according to claim 1, wherein the plurality of the data streams comprises a third stream of the data, and wherein modulating at least the first and second streams of the data comprises modulating the third stream of the data to generate a third modulated signal, and
   wherein up-shifting at least the second modulated signal comprises up-shifting the second modulated signal to a first passband, and up-shifting the third modulated signal to a second passband, above the first passband, and
   wherein transmitting the passband signal comprises transmitting the second and third modulated signals over the communication medium in the first and second passbands, respectively, while transmitting the first modulated signal over the communication medium as the baseband signal.

4. The method according to claim 1, wherein transmitting the passband signal comprises mixing the up-shifted second modulated signal with the baseband signal for transmission over the communication medium.

5. The method according to claim 1, wherein modulating at least the first and second streams of the data comprises modulating the first stream of the data using a first modem to generate the first modulated signal, and modulating the second stream of the data using a second modem to generate the second modulated signal.

6. The method according to claim 5, wherein the first and second modems comprise legacy voice-band modems.

7. The method according to claim 5, wherein modulating the first and second streams of the data using the first and second modems comprises generating first and second modulated analog signals using the modems, and wherein up-shifting at least the second modulated signal comprises applying analog up-shifting to the second modulated analog signal.

8. The method according to claim 1, wherein up-shifting at least the second modulated signal comprises applying single-side-band modulation to the second modulated signal.

9. The method according to claim 1, wherein up-shifting at least the second modulated signal comprises mixing the second modulated signal with a carrier frequency in the passband.

10. The method according to claim 1, wherein the second modulated signal comprises a sequence of digital samples, and wherein up-shifting at least the second modulated signal comprises applying a digital frequency shift to the second modulated signal so as to generate frequency-shifted digital samples.

11. The method according to claim 10, wherein transmitting the passband signal comprises converting the frequency-shifted digital samples to an analog output signal.

12. The method according to claim 1, and comprising:
   simultaneously receiving the baseband signal transmitted over the telephone line as a first input baseband signal, and receiving the passband signal transmitted over the telephone line;
   down-shifting the received passband signal to generate at least a second input baseband signal;
   demodulating at least the first and second input baseband signals, respectively using at least first and second voice-band modems, to recover the first and second streams of the data; and
   recombining the first and second streams of the data in order to recover the data generated by the computer.

13. The method according to claim 12, wherein modulating at least the first and second streams of the data comprises adding synchronization signals to the data, and wherein recombining the first and second streams of the data comprises recombining the streams of the data using the synchronization signals.

14. Apparatus for receiving data multiplexed by a sending computer into at least first and second streams, the apparatus comprising:
   an analog input circuit, which is adapted to receive a data signal transmitted over a telephone line, the data signal comprising a first baseband component and a passband component;
   a down-shifter, which is coupled to down-shift the passband component so as to generate at least a second baseband component;
   first and second voice-band modems, which are coupled to demodulate the first and second baseband components, respectively, to recover the first and second streams of the data; and
   a multiplexer, which is coupled to recombine the recovered first and second streams of the data.

15. The apparatus according to claim 14, wherein the down-shifter is adapted to apply first and second down-shifts to generate, respectively, the second baseband component and a third baseband component, and comprising a third voice-band modem, which is coupled to demodulate the third baseband component to recover a third stream of the data.

16. The apparatus according to claim 14, wherein the first and second voice-band modems operate in accordance with a voice-band modem specification, which is selected from among ITU-T recommendations V.34, V.90 and V.92.

17. The apparatus according to claim 14, wherein the first and second voice-band modems comprise legacy voice-band modems.

18. The apparatus according to claim 14, wherein the down-shifter is adapted to apply analog down-shifting to the data signal so as to separate the first and second baseband components, and wherein the apparatus comprises first and second analog/digital converters, which are respectively coupled to digitize the first and second baseband components individually for input to the respective voice-band modems.

19. The apparatus according to claim 14, and comprising an analog/digital converter, which is coupled to digitize the data signal to generate a sequence of digital samples, wherein the down-shifter is adapted to apply a digital frequency shift to the samples so as to generate second baseband component.

20. A computer software product, comprising a computer-readable medium in which program instructions are stored, which instructions, when read by a computer, cause the computer to divide data generated by a computer into a plurality of data streams comprising at least first and second streams of the data, to modulate the first and second streams of the data in accordance with a voice-band modem specification, so as to generate respective first and second modulated signals, to up-shift at least the second modulated signal to generate a passband signal, and to simultaneously transmit the passband signal and the first modulated signal as a baseband signal over a telephone line.

21. A method for receiving data multiplexed by a sending computer into at least first and second streams, the method comprising:
   receiving a data signal transmitted over a telephone line, the data signal comprising a first baseband component and a passband component;
   down-shifting the passband component to generate at least a second baseband component;
   demodulating at least the first and second baseband components, using first and second voice-band modems, respectively, to recover at least the first and second streams of the data; and
   recombining the recovered first and second streams of the data.

22. The method according to claim 21, wherein down-shifting the passband component comprises applying first and second down-shifts to generate, respectively, the second baseband component and a third baseband component, and wherein demodulating at least the first and second baseband components comprises demodulating the third baseband component to recover a third stream of the data.

23. The method according to claim 21, wherein the first and second voice-band modems operate in accordance with a voice-band modem specification, which is selected from among ITU-T recommendations V.34, V.90 and V.92.

24. The method according to claim 21, wherein the first and second voice-band modems comprise legacy voice-band modems.

25. The method according to claim 21, wherein down-shifting the passband component comprises applying analog down-shifting to the data signal so as to separate the first and second baseband components, and
   wherein demodulating at least the first and second baseband components comprises digitizing each of the baseband components individually for input to the respective voice-band modems.

26. The method according to claim 21, wherein down-shifting the passband component comprises digitizing the data signal to generate a sequence of digital samples, and applying a digital frequency shift to the samples so as to generate the second baseband component.

27. Apparatus for data transmission, comprising:
   a multiplexer, which is coupled to divide data generated by a computer into a plurality of data streams comprising at least first and second streams of the data;
   data modulation circuitry, which comprises:
      first and second voice-band modems, which are respectively coupled to modulate the first and second streams of the data in accordance with a voice-band modem specification, so as to generate respective first and second modulated signals;
      an up-shifter, which is coupled to up-shift at least the second modulated signal to generate a passband signal; and
   an analog output circuit, which is coupled to transmit the passband signal and to transmit the first modulated signal as a baseband signal over a telephone line.

28. The apparatus according to claim 27, wherein the voice-band modem specification is selected from among ITU-T recommendations V.34, V.90 and V.92.

29. The apparatus according to claim 27, wherein the plurality of the data streams comprises a third stream of the data, and
   wherein the apparatus comprises a third voice-band modem, which is coupled to modulate the third stream of the data to generate a third modulate signal,
   wherein the up-shifter is adapted to up-shift the second signal to a first passband, while up-shifting the third signal to a second passband, above the first passband, so that the analog output circuit transmits the second and third signals over the telephone line in the first and second passbands, respectively, while transmitting the first signal over the telephone line as the baseband signal.

30. The apparatus according to claim 27, wherein the first and second voice-band modems are adapted to output the first and second signals as respective first and second sequences of digital samples, and wherein the up-shifter is adapted to digitally up-shift the digital samples in the second sequence so as to generate frequency-shifted digital samples, and wherein the data modulation circuitry is adapted to digitally mix the frequency-shifted digital samples with the digital samples in the first sequence, and to convert the digitally-mixed samples to analog signals for transmission over the telephone line.

31. The apparatus according to claim 27, wherein the first and second voice-band modems are adapted to output the first and second signals as respective first and second sequences of digital samples, and wherein the data modulation circuitry comprises at least one digital/analog converter (DAC), which is adapted to convert the first and second sequences of the digital samples to respective first and second analog signals, and wherein the up-shifter comprises an analog frequency shifter, which is coupled to up-shift the second analog signal to the passband, and wherein the data modulation circuitry further comprises an analog mixer, which is adapted to mix the up-shifted second signal with the baseband signal for transmission over the telephone line.

32. The apparatus according to claim 31, wherein the analog frequency shifter comprises at least one of a single side-band modulator and a frequency mixer, for mixing the modulated signal with a carrier frequency in the passband.

33. The apparatus according to claim 27, wherein the first and second voice-band modems comprise legacy voice-band modems.

34. The apparatus according to claim 27, wherein the data modulation circuitry is adapted to generate the passband signal for transmission over the telephone line simultaneously with transmission over the telephone line of a baseband voice signal.

35. The apparatus according to claim 27, and comprising a receiver, which is coupled to the telephone line so as to simultaneously receive the baseband signal as a first input baseband signal, and to receive the passband signal, and which is adapted to down-shift the received passband signal to generate a second input baseband signal, and to demodulate the first and second input baseband signals to recover the first and second streams of the data, and to recombine the first and second streams of the data in order to recover the data generated by the computer.

36. The apparatus according to claim 35, wherein the data modulation circuitry is adapted to add synchronization signals to the first and second streams of the data, and wherein the receiver is adapted to recombine the first and second streams of the data using the synchronization signals.

37. Apparatus for data communication, comprising:

a data transmitter, which is adapted to divide data generated by a computer into a plurality of data streams comprising at least first and second streams of the data, to modulate the first and second streams of the data in accordance with a voice-band modem specification, so as to generate respective first and second modulated signals, to up-shift at least the second modulated signal to generate a passband signal, and to simultaneously transmit the passband signal and transmitting the first modulated signal as a baseband signal over a telephone line; and a data receiver, which is coupled to simultaneously receive the baseband signal transmitted over the telephone line as a first input baseband signal, and to receive the passband signal transmitted over the telephone line, to down-shift the received passband signal to generate a second input baseband signal, and to demodulate the first and second input baseband signals, respectively using first and second voice-band modems, to recover the first and second streams of the data, and to recombine the first and second streams of the data in order to recover the data generated by the computer.

38. The apparatus according to claim 37, wherein one of the data transmitter and data receiver is deployed as customer premises equipment, while the other of the data transmitter and data receiver is deployed in a central communication office.

39. A method for data transmission, comprising:

dividing data generated by a computer into a plurality of data streams comprising at least first and second streams of the data;

modulating at least the first and second streams of the data in accordance with a voice-band modem specification, so as to generate respective first and second modulated signals;

up-shifting the first modulated signal to a first passband to generate a first passband signal;

up-shifting the second modulated signal to a second passband, above the first passband, to generate a second passband signal; and simultaneously transmitting the first and second passband signals over a telephone line.

* * * * *